United States Patent Office 3,449,984
Patented June 17, 1969

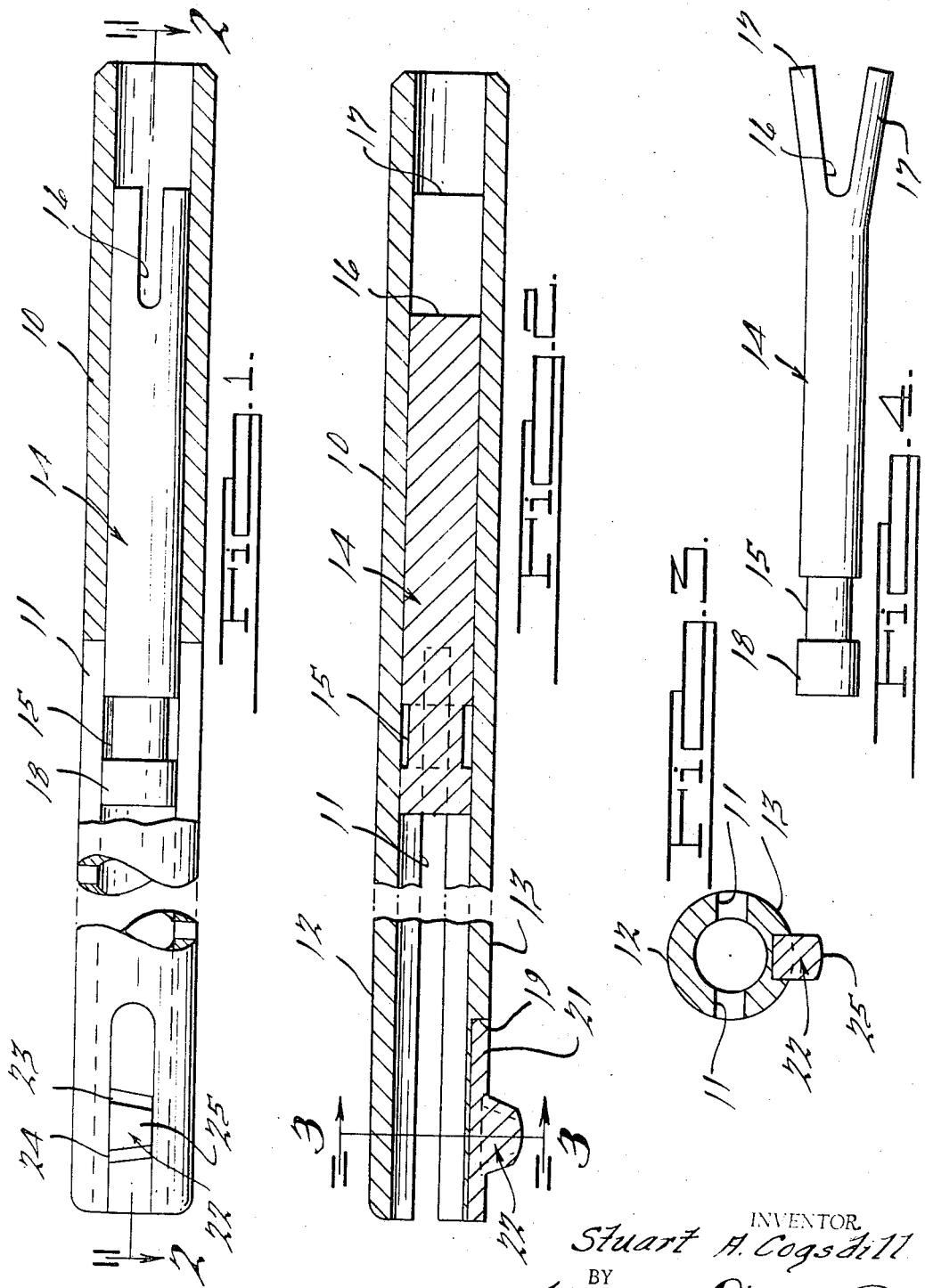

3,449,984
DEBURRING TOOL AND A METHOD OF
MAKING A DEBURRING TOOL
Stuart A. Cogsdill, Orchard Lake, Mich., assignor to
Cogsdill Tool Products, Inc.
Filed Oct. 6, 1964, Ser. No. 401,876
Int. Cl. B21k *21/00;* B23b *51/10;* B23d *77/00*
U.S. Cl. 76—101        2 Claims This invention relates to deburring tools and a method of making a deburring tool, and particularly to a deburring tool which is adjustable to change its resistance to deflection without removing the tool from its supporting collet.

The deburring tool is constructed of simple material and can be considered of the disposable type to be discarded when the cutting nib becomes thin. The tool is made from a steel tube of the low carbon cold drawn type and is case hardened on the inner and outer sides after it has been machined. A diametrical slot is provided in the tube inwardly from one end thereof to approximately the tube center. One of the semi-cylindrical portions is milled lengthwise at the end to provide a slot for receiving the base of a nib of hard material which is brazed therein with the nib extending outwardly thereof. The nib has sloping cutting faces at each edge which are relieved toward the rear and has a crown portion at the top. A pin is disposed within the tube having a necked portion at one end providing a head which acts as a fulcrum from which semi-cylindrical portions may deflect. The opposite end of the pin has a slot forming two branches which are spread apart to frictionally engage the inner wall of the tube for locking the pin in adjusted position. By inserting a pointed element in the slot within the necked portion, the head can be moved toward the nib and by engaging the opposite side of the head, the head can be moved away from the nib. This adjustment can be made while the supported end of the tube body is in the driving collet and the tool need not be removed from the machine when the force required to deflect the end of the semi-cylindrical portion of the tube having the nib thereon is to be changed.

Accordingly, the main objects of the invention are: to provide a deburring tool and a method of making a deburring tool from a length of tube of low carbon steel which is reamed and slotted at one end before being case hardened to provide spring properties to the two semi-cylindrical separated portions; to apply an insert of high speed steel in a longitudinal slot at the end of one of the semi-cylindrical separated portions having a nib extending outwardly thereof for deburring either end of an aperture; to provide a pin within a tubular deburring tool having a head at one end and spread portions at the other end which is adjustable lengthwise within the central aperture of the tool for changing the fulcrum point over which the semi-cylindrical portions may deflect; to retain a pin in adjusted position within the hollow tubular body of a deburring tool by slotting one of the ends and expanding the two portions into Y-relation for frictional engagement with the side of the inner wall of the tube; and in general, to provide a low cost, positive acting deburring tool which is simple in construction, positive in operation and economical of manufacture.

Other objects and features of novelty of the invention will be specifically pointed out or will become apparent when referring, for a better understanding of the invention, to the following description taken in conjunction with the accompanying drawing, wherein:

FIG. 1 is a broken plan view, with parts in section, of a deburring tool embodying features of the present invention;

FIG. 2 is a longitudinal sectional view of the structure illustrated in FIG. 1, taken on the line 2—2 thereof;

FIG. 3 is a sectional view of the structure illustrated in FIG. 2, taken on the line 3—3 thereof, and FIG. 4 is a view of a pin employed within the hollow interior of the tool body illustrated in FIGS. 1, 2 and 3.

Referring to the figures, the deburring tool of the present invention comprises a cylindrical body 10, constructed from a cold drawn or like tube made of low carbon steel machined from one end to provide a slot 11 therein which separates substantially one half of the body into two semi-cylindrical portions 12 and 13. The interior of the length of the tube is reamed to receive a pin 14 made from a rod and machined to have a necked portion 15 near one end and a slot 16 in the opposite end. The branches 17 at the end are spread apart in Y-shape to frictionally engage the inner wall of the body 10 when forced therealong for retaining the pin 14 in adjusted position therewithin. The pin may be hardened to have the ends 17 function as a spring to maintain the frictional engagement with the inner wall of the body. The necked portion 16 near the opposite end of the pin 14 provides a head 18 which forms a fulcrum for the two semi-cylindrical portions 12 and 13 for controlling the bending moment thereof.

The semi-cylindrical portion 13 has a recess 19 machined therein, 90° from the slot 11, in which an insert 21 of high speed steel or other alloy having cutting characteristics, is secured by a brazing or other operation. The insert 21 has a nib 22 extending outwardly therefrom and provided with sloping cutting edges 23 and 24 which are relieved rearwardly therefrom. The top portion 25 of the nib is arched transversely and longitudinally to act as a cam to aid in the deflection of the semi-cylindrical portion 13 of the body and to reduce friction with the inner surface of the aperture which is to have the edges deburred.

After the tool has been inserted in a collet on the arbor of a machine, the adjustment of the head 18 of the pin 14 within the tool body changes the bending moment of the semi-cylindrical end portion 13. A pointed tool is inserted in the slot 13 and the necked portion 15 in engagement with the inner side of the head to force the pin toward the nib end of the body or in engagement with the outer side of the head for moving the head and pin away from the nib end of the body. In the former adjustment the semi-cylindrical portions are shortened and made stronger while in the latter adjustment, the portions are longer and weaker providing less resistance to deflection.

As the body 10 is made of a length of standard tubing of the low carbon type, the pin 14 is made from rod material, the nib containing the insert 21 is of small dimension, and simple machining, heat treating and brazing operations are employed, it should be evident that the resulting tool is low in cost and is disposable when the nib has worn out. A further advantage in the tool is that which permits the bending moment of the nib to be adjusted without the necessity of removing the tool from the supporting collet, which could result in substantial down-time to the machine and a possible change in the position of the tool therein.

What is claimed is:

1. In a deburring tool, a tubular body having a diametrical slot therein providing two portions which are relatively movable toward each other, a nib on one of said portions near the forward end thereof, a pin having a necked portion at one end to provide a fulcrum head which is adjusted to change the bending moment of the two portions, and means providing frictional engagement between the inner wall of the tubular body and said pin to secure the pin in adjusted position therein, said tubular body being made from a standard tube of low carbon steel which is case hardened on the inner and outer sides, and said nib being made of a hard cutting material which is brazed to said forward end of said portion cutting material.

2. The method of construction of a deburring tool which includes the steps of: dressing the inside of a length of standard tube of low carbon steel to a desired diameter, diametrically slotting the tube inwardly from one end to provide two portions, slotting one of the portions at the free end thereof, case hardening the inner and outer walls of the tube, brazing a cutting nib in the slot in one of the portions, and frictionally retaining a pin within said tube which pin is adjustable therealong by means of a recess adjacent one end of said pin forming a head thereon which functions as a fulcrum and changes the bending moment of the two portions when the pin is adjusted within the tube and retained in adjusted position by said frictional retention.

References Cited
UNITED STATES PATENTS 3,217,570    11/1965    Cogsdill _____ 77—73.5

FRANCIS S. HUSAR, *Primary Examiner.*

U.S. Cl. X.R.

77—73.5